Feb. 24, 1959     A. K. PETERSON     2,874,841
OSCILLATABLE SEPARATOR MEANS
Filed Dec. 21, 1953     2 Sheets-Sheet 1
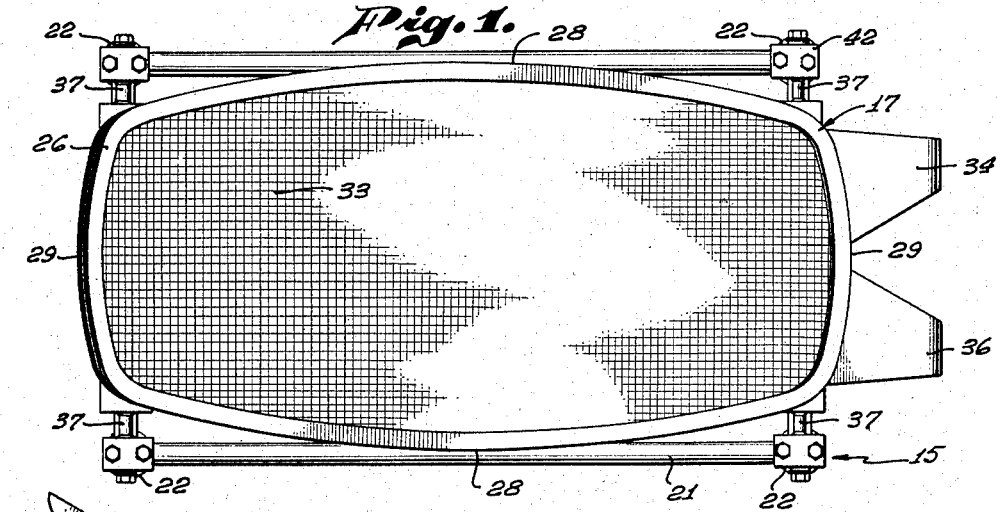
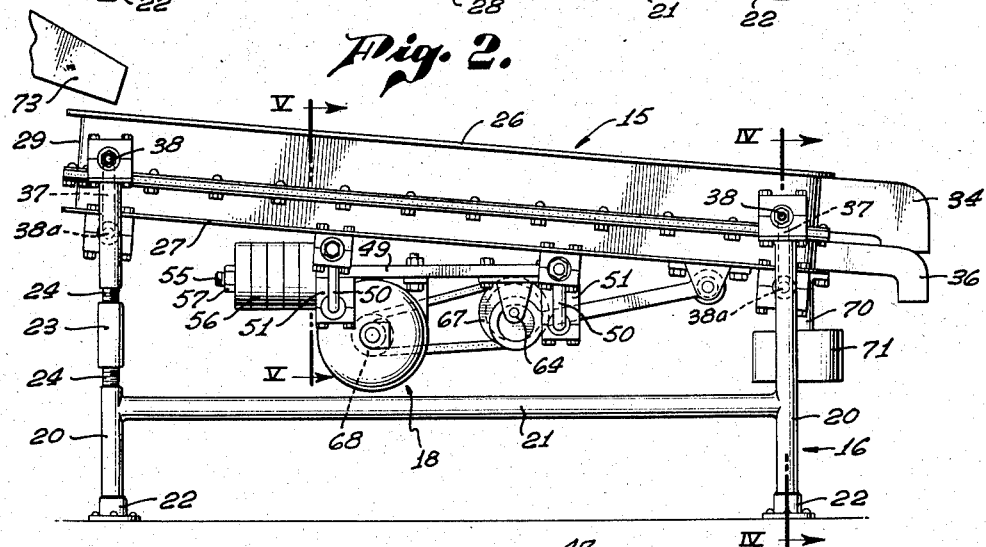
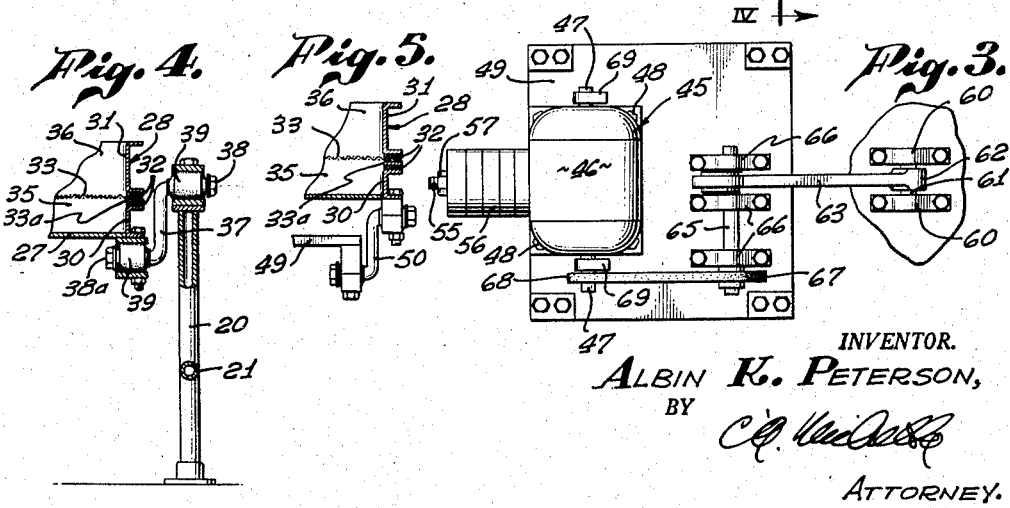
INVENTOR.
ALBIN K. PETERSON,
BY
ATTORNEY.

Feb. 24, 1959
A. K. PETERSON
2,874,841
OSCILLATABLE SEPARATOR MEANS
Filed Dec. 21, 1953
2 Sheets-Sheet 2
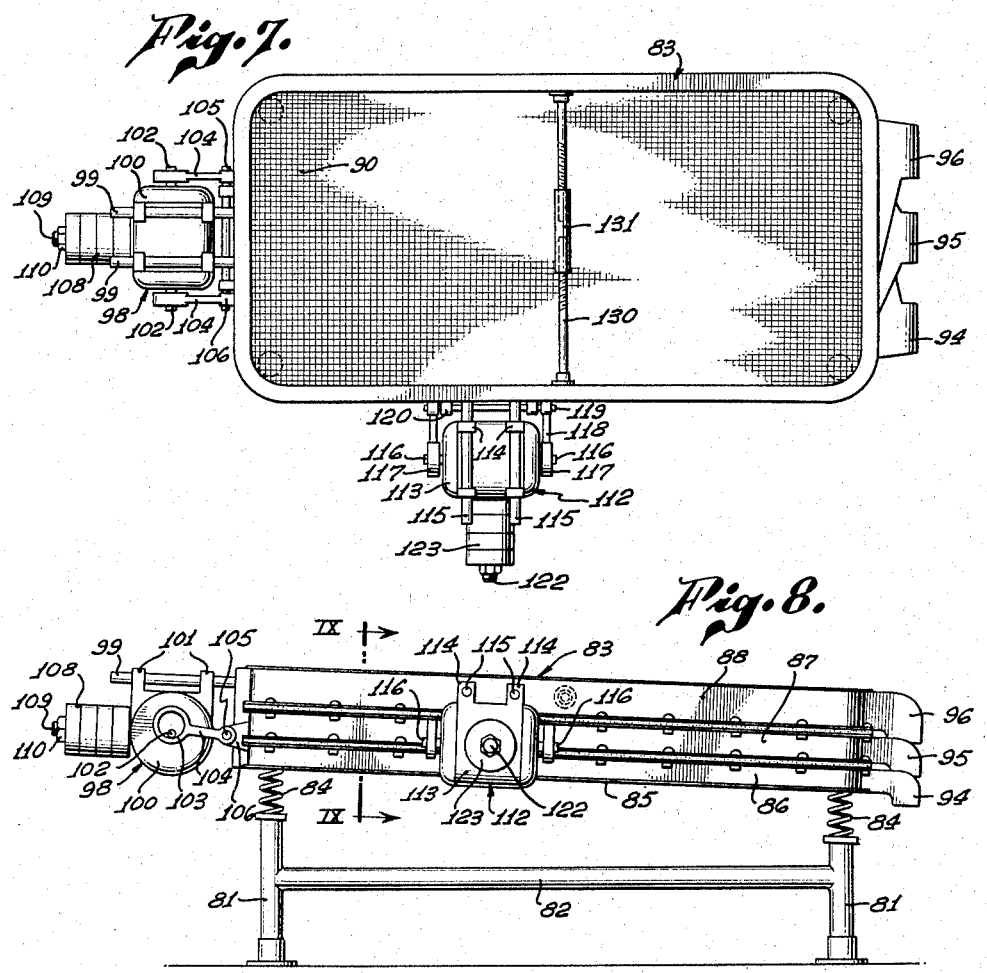
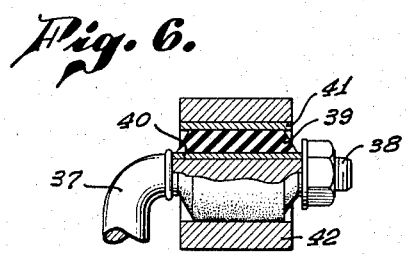
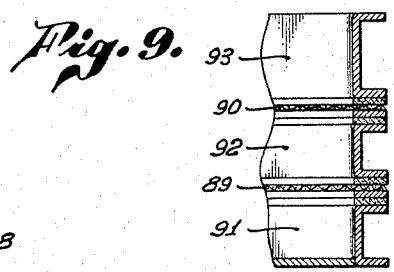
INVENTOR.
ALBIN K. PETERSON,
BY
ATTORNEY.

United States Patent Office 2,874,841
Patented Feb. 24, 1959

2,874,841

OSCILLATABLE SEPARATOR MEANS

Albin K. Peterson, Torrance, Calif.

Application December 21, 1953, Serial No. 399,475

17 Claims. (Cl. 209—329)

This invention relates to an improved oscillatable separator means for sifting and separating aggregative material having discrete particles of different and various sizes. More particularly, the invention relates to a separator means wherein the receptacle which receives the material to be separated is oscillated and vibrated in a novel manner.

Prior proposed oscillatable separator means have included receptacles or boxes to receive the aggregative material to be separated, said boxes being provided with one or more screen means of different mesh sizes to segregate particles of selected size. Such prior proposed receptacles were usually vibrated in a longitudinal direction by a motor means supported from the frame of the separator or from the floor adjacent to the separator. The motor means was connected to the box by a suitable crank arm which was eccentrically mounted on the shaft of the motor means for vibrating the receptacle. One of the major disadvantages of such prior proposed oscillatable separator means was that the vibrations imparted by the motor means to the receptacle were also imparted to the supporting structure with the result that the entire supporting structure was subjected to vibration. Obviously when heavy materials were being separated and the vibratory force was great, vibration of the supporting floor and parts of the building was very objectionable and created an undesirable working condition. Another disadvantage was that the relative fixed connection of the vibrating means to the supporting surface caused excessive wear on various parts of the mechanism.

This invention contemplates an improved oscillatable separator means wherein the transmission of vibratory impulses to a supporting structure is virtually entirely eliminated so that the building and floor in which the vibrating machine is operated is not subjected to vibration. The construction and arrangement of the separator means of this invention also results in minimizing wear of parts of the mechanism.

It is therefore the primary object of this invention to disclose and provide a novel improved oscillatable separator means for sifting and separating particles of selected size from an aggregative material to be separated.

An object of this invention is to disclose and provide a novel separator means wherein transmission of vibratory impulses to structures supporting the separator means of this invention is virtually eliminated.

An object of this invention is to disclose and provide a novel construction for oscillating a receptacle means containing aggregative material to be separated and wherein the oscillatable means is mounted upon the receptacle means.

A further object of this invention is to disclose and provide oscillating means carried by a receptacle means wherein the oscillating means is provided relative movement with the receptacle means.

Still another object of this invention is to disclose and provide such a novel oscillatable separator means wherein the amplitude and frequency of the oscillations imparted to the receptacle means may be readily controlled and varied.

A further object of this invention is to disclose and provide such an oscillatable separator means wherein oscillations may be imparted to the receptacle means vertically, horizontally, and laterally and so that vibrations imparted in each direction may be independently controlled so as to impart to the aggregative material being separated a most effective movement pattern for efficiently separating the material.

The invention contemplates such a readily controlled oscillatable means floatingly mounted on the receptacle means wherein the pattern of vibration imparted to the receptacle means may be in a straight line, curving lines, and may include a rocking motion wherein a vertical vibratory component is employed.

Generally speaking, this invention contemplates a novel construction and arrangement of an oscillatable separator means wherein a receptacle means adapted to receive material to be separated is mounted from a base frame with virtually universal movement with respect thereto. Means for oscillating the receptacle means comprises a motor means carried by the receptacle means and provided with a yieldable and a spaced eccentric connection to the receptacle means. The oscillatable means is adapted to carry one or more of a plurality of weight members arranged to modify the amplitude of vibration imparted to the receptacle means. The separator means is so arranged that one or more of said oscillatable means may be yieldably carried by the receptacle means so as to impart vibrations thereto in a longitudinal, lateral, and vertical direction.

Other advantages and objects of this invention will be readily apparent from the following description of the drawings wherein exemplary embodiments of this invention are illustrated.

In the drawings:

Fig. 1 is a top plan view of a separator machine embodying this invention.

Fig. 2 is a side view of Fig. 1.

Fig. 3 is a fragmentary bottom view showing oscillatable means for said machine.

Fig. 4 is a transverse section taken in the vertical plane indicated by line IV—IV of Fig. 2.

Fig. 5 is a fragmentary transverse section taken in the vertical plane indicated by line V—V of Fig. 2.

Fig. 6 is an enlarged fragmentary view, partly in section, illustrating a typical yieldable connection between the base frame and the receptacle means of this invention.

Fig. 7 is a top plan view of a different embodiment of this invention.

Fig. 8 is a side elevational view of Fig. 7.

Fig. 9 is a fragmentary transverse view taken in a vertical plane indicated by line IX—IX of Fig. 8.

Referring first to the exemplary embodiment of this invention shown in Figs. 1 to 6 inclusive, it will be noted that the oscillatable separator machine, generally indicated at 15, comprises a base frame means 16, a receptacle means 17 yieldably suspended from said base frame means and oscillatable power or motor means 18 carried by the receptacle means 17.

The base frame means 16 may comprise a plurality of spaced upstanding head and tail posts 20 interconnected by longitudinally extending horizontal members 21. The posts 20 and members 21 may be made of any suitable material such as pipe stock. As illustrated, each post 20 is fixed to a floor or a supporting surface by suitable flanged pipe fittings 22. It is understood, however, that each post 20 may be provided with suitable wheels or castors for permitting easy transportability of the separator machine. Vibrations of the separator machine are not transmitted to the base frame means as later described.

In order to support the receptacle means 17 at a selected angle to the horizontal, adjacent head posts 20 may be provided with adjustable elevating means in the form of a threaded turnbuckle 23 having oppositely directed threaded portions 24 engaging internal threads on top and bottom elements of each head post 20.

The receptacle means 17 may comprise an elongated somewhat elliptical sifting or screening box 26. The box 26 comprises an imperforate metal bottom wall 27, side walls 28, and end walls 29. In the construction illustrated, each side wall 28 and end wall 29 may comprise top and bottom peripheral wall portions 30 and 31 of outwardly facing channel section. Wall portion 30 may be welded to the bottom wall 27. Between opposed flanges of wall portions 30 and 31 may be peripheral gaskets 32 of any suitable material. Portions 30 and 31 may be secured together by a plurality of spaced nut and bolt assemblies.

A screen means 33 of pre-selected mesh size may be stretched across and between the side and end walls, and secured as by seating peripheral edge margins of the screen means 33 between gaskets 32 and the opposed flanges of the wall portions 30 and 31. The screen means may include peripheral flat bar 33a to which the screen material may be secured as by welding. It is understood that additional screen means for further separation of material may be included in the receptacle means by adding additional wall portions and screws on top of wall portion 31 and securing such additional screen means of pre-selected mesh size between opposed flanges of said wall portions.

The bottom wall 27 and wall portion 30 define a bottom compartment 35 in which material may collect and from which the collected material may be discharged through a discharge duct 36 at the tail end of the receptacle means. Similarly, material collected on top of screen means 33 may be discharged from a discharge duct 34 laterally spaced from duct 36.

Means for yieldably mounting the receptacle means 17 from the base frame means 16 so as to permit oscillating movement of the receptacle means in a longitudinal direction and limited oscillating movement in vertical and lateral directions may comprise a hangar 37 having an outwardly turned end portion 38 resiliently connected to the top of each post 20. The lower end portion 38a of hangar 37 is turned inwardly and is resiliently connected to the adjacent portion of the bottom wall 27 and wall portion 30. Each of the resilient connections of hangar 37 to the posts 20 and to the receptacle means may include a yieldable resilient coupling as more particularly illustrated in Fig. 6. Each end portion 38 and 38a is enclosed by a resilient yieldable mounting member 39 of rubber or other suitable material having a bore within which may be inserted a sleeve 40 to which member 39 is bonded by well-known means. The outer surface portion of member 39 may be bonded to a concentric sleeve 41 received within a bore provided by a split bearing bushing 42. It will thus be readily apparent that the yieldable mounting connections of hangar 37 to the posts 20 and to the receptacle means affords not only swinging movement of the receptacle means in a longitudinal direction, but also permits limited lateral and vertical displacement of the receptacle means by reason of the resilient member 39.

Means for oscillating the receptacle means 17 in a longitudinal direction may comprise a laterally disposed motor means 45 having a motor housing 46 and oppositely directed motor shaft end portions 47 extending from opposite ends of the motor housing 46. The axis of the motor shaft end portions lies perpendicularly to the longitudinal axis of the receptacle means 17. The motor housing 46 may be connected by corner nut and bolt assemblies 48 to a motor mounting plate 49. The motor mounting plate 49 may be floatingly suspended centrally from the receptacle means 17 by means of longitudinally spaced pairs of hangars 50. Each hangar 50 is similar to hangar 37 and is connected at one end to a depending bracket 51 carried by plate 49 by a resilient yieldable coupling connection including a split-bearing bushing such as that shown in Fig. 6. The upper end of each hangar is similarly connected through such a resilient yieldable coupling and bushing to the bottom wall 27 of the receptacle means. It will thus be apparent that the motor means 45 is swingably suspended for longitudinal movement from the bottom wall 27 of the receptacle means and is capable of limited vertical and lateral agitating movement.

The motor mounting plate 49 may be provided with a horizontally extending rod 55 directed towards the head end of the receptacle means and which is adapted to carry one or more of a plurality of selected weights 56. The weights 56 may be secured on rod 55 by a nut 57. The weights 56 serve to modify the amplitude of vibrations imparted to the receptacle means as later described.

Means for connecting the motor shaft end portions 47 to the bottom wall of the receptacle means may comprise a pair of depending ported brackets 60 secured to the bottom wall at points spaced from the mounting of the motor mounting plate 49 and adjacent the discharge end of the receptacle means. The brackets 60 carry a pin 61 which is yieldably and resiliently connected as by a resilient member 39 to end 62 of a crank member 63 disposed in a vertical plane passing through the longitudinal axis of the receptacle means, said crank member 63 having an eccentric connection as at 64 to a countershaft 65. The countershaft 65 may be supported from a plurality of spaced bearing brackets 66 connected to the bottom surface of the mounting plate 49. One end of countershaft 65 may carry a pulley 67 which is connected to a smaller drive pulley 68 carried by one of the motor shaft end portions 47. Each end portion 47 may carry an eccentrically mounted weight element 69.

Means for varying the position of the center of gravity of the receptacle means 17 in order to accommodate the separator machine to materials of different weight may comprise a depending rod 70 carried by the receptacle means adjacent the discharge end thereof, the axis of the depending rod 70 being in the same vertical plane as the longitudinal axis of the receptacle means. A selected weight 71 may be adjusted vertically on rod 70 so as to vary the location of the center of gravity of the receptacle means and the oscillating means carried thereby.

In operation of the exemplary embodiment shown in Figs. 1–6, the slope of the receptacle means 17 may be adjusted to a selected angle by the turnbuckle 23. Adjustment of the slope of the receptacle means 17 will vary the vertical force component transmitted to the receptacle means by the angularly disposed crank arm 63 because the angular relation of the crank arm with respect to the direction of gravitational forces is thereby modified. A selected number of weights 56 may be mounted on rod 55 so as to afford a selected weight or resistance to oscillatory movement of the receptacle means. The weight 71 carried by the rod 70 may be positioned thereon depending upon the weight of the mass of material to be carried by the receptacle means so as to selectively position the center of gravity of the receptacle means, oscillating means, and material being separated. Aggregative material to be separated may be introduced to the receptacle means 17 by a chute 73 disposed above the head end of the receptacle means. Material discharged from chute 73 falls by gravity upon the screen means 33 at the head end thereof.

When the motor means 45 is started, the eccentric connection of the motor shaft end portions to the bottom wall of the receptacle means adjacent the discharge end thereof imparts a longitudinal vibration thereto. It will be readily apparent that vibratory impulses which tend to urge the receptacle means in a direction toward the tail end of the machine will also tend to move the entire oscillating means 18 in the opposite direction toward the head of the receptacle means. At the same time, the eccentric weights 69 on the motor shaft end portions introduces a vibration which is transmitted through the eccentric connection to the receptacle means.

It should be noted that when the total weight of the oscillating means 18 is virtually equal to the total weight of the receptacle means 17 with material therein, the oscillations produced by the eccentric connection are virtually the same. The amplitude of oscillations imparted to the material to be separated is in direct ratio to the difference in mass of the oscillating means and the receptacle means with contents. Since the oscillating means 18 is free to oscillate on the hangers 50 and the receptacle means is free to oscillate on the hangers 37, the two means are constantly in opposition.

A suitably straight line impulse will be imparted to the receptacle means when the weight 71 is positioned to bring the center of gravity in line with the pivotal connection of the crank member 63 with the shaft 61. The eccentric weights 69 impart a vertical component of vibration to the receptacle means through the hangers 50 and resilient coupling means as the horizontal vibratory component is dissipated by the swinging action of the supporting hangers. It is understood the vertical vibratory component may be substantially eliminated by removing eccentric weights 69.

The mass of material being separated travels along the screen means 33 and the bottom wall 27 to the tail end of the receptacle means and is discharged through ducts 37 and 36 respectively. Suitable container means (not shown) may be used to collect the separated material.

Vibrations imparted to the receptacle means will not be transmitted to the base frame means 16 because of the swinging suspension of the receptacle means and the motor means from the base frame means.

In the embodiment of this invention shown in Figs. 7–9 inclusive, the oscillatable separator machine is arranged principally for controllably imparting vibrations in both longitudinal and lateral directions.

In Fig. 8 a base frame means may comprise a plurality of upstanding posts 81 interconnected by longitudinally extending members 82. Posts 81 at the tail end of the machine may be shorter than posts 81 at the head end of the machine so as to provide selected inclination of the receptacle means, generally indicated at 83.

Means for mounting the receptacle means 83 from the base frame means may comprise a suitable upstanding helical spring 84 carried by the top of each post 81 and having its axis normally aligned with the axis of post 81. The top of each helical spring 84 may be secured to a bottom wall 85 of the receptacle means 83. It will thus be apparent that the receptacle means is supported for virtually universal oscillatory movement on the base frame means.

The receptacle means 83 may comprise a bottom peripheral box section 86, intermediate box section 87 and a top box section 88 of slightly greater depth than sections 86 and 87. The bottom section 86 may be secured to the bottom wall 85 in any suitable manner, as by welding. Each section 86, 87 and 88 may be fabricated from interconnected outwardly facing channel section members as in the prior embodiment.

Screen means 89 and 90 may extend across the receptacle means in vertically spaced relation and may be secured between the flanges of the respective adjacent box sections 86, 87, and 87, 88 in a manner similar to that described in the first embodiment. The screen means 89 and 90 may be selected of any suitable mesh size, screen means 90 having a larger mesh opening than screen means 89. The screen means may be held tightly stretched and taut as by a spreader bar 130 provided with a turnbuckle means 131, said bar extending transversely across the receptacle means.

The box sections 86, 87, 88, and the associated screen means 89 and 90 form compartments 91, 92 and 93 for collecting graded sizes of material being separated. Compartment 91 is provided with a discharge duct 94 at the tail end of the separating machine. Similarly, compartments 92 and 93 are provided with laterally spaced discharge ducts 95 and 96 respectively.

Means for imparting oscillations in a longitudinal direction to receptacle means 83 for shaking and sifting material to be separated through the several screen means may comprise a motor means 98 disposed at the head end of the receptacle means. Attached to the receptacle means in any suitable manner may be a pair of laterally spaced longitudinally extending parallel motor support members 99. The members 99 are centrally arranged so as to virtually align the transverse axis of the motor means 98 with the longitudinal axis of the receptacle means. The motor means 98 is provided with a motor housing 100 having adjacent each end a pair of upstanding lugs 101 provided with aligned openings which are adapted to slidably receive members 99. The motor means 98 is thus mounted on the receptacle means with a slidable, yieldable connection thereto.

The motor shaft of the motor means 98 includes oppositely projecting shaft portions 102, each provided with an eccentric connection as at 103 to a crank arm 104. Each crank arm 104 may be pivotally connected to a pin 105 carried by brackets 106 secured to the head end wall of receptacle means 83.

Means to modify or vary the amplitude of vibratory impulses imparted to the receptacle means 83 may include one or more of a plurality of weight members 108 removably supported upon a shaft 109 connected to the motor housing 100 and arranged with its axis lying in the same vertical plane as the longitudinal axis of the receptacle means 83. The weight members 108 may be secured in any suitable manner as by a nut 110. It may be noted that the axis of the shaft 109 intersects the axis of the motor shaft portions 102.

Means for imparting lateral vibratory impulses to the receptacle means 83 may comprise a similarly arranged and mounted motor means 112 carried at one side of the receptacle means 83 intermediate its ends.

The motor means 112 includes a motor housing 113 provided with a pair of upstanding ported lugs 114 adapted to slidably receive a pair of longitudinally spaced motor support members 115 secured to the side wall of the receptacle means in any suitable manner. The motor means 112 is provided with oppositely projecting motor shaft end portions 116, each having an eccentric connection as at 117 to a crank arm 118 which is pivotally connected to a pin 119 carried by ported brackets 120 attached to the adjacent side wall of the receptacle means 83. The motor housing 113 carries a sidewardly projecting shaft 122 upon which may be mounted one or more of a plurality of weight elements 123 for modifying the magnitude of the lateral vibratory impulses imparted to the receptacle means. If desired, weight elements 123 may be mounted on an extension of shaft 122 which passes beneath the receptacle and which supports elements 123 on the opposite side of the receptacle.

In operation of the embodiment shown in Figs. 7 to 9 inclusive, a material discharge chute may be positioned adjacent the head end of the receptacle means for discharging by gravity or other means material to be separated into the receptacle means. Actuation of the motor means 98 causes a longitudinal vibratory impulse to be transmitted to the receptacle means because of the eccentric connection 103 to the motor means of the crank 104, Rotation of the motor shaft end portions causes the motor housing to be reciprocally moved along the slide members 99 while at the same time the eccentric connection causes vibratory movement of the receptacle means. It will be readily apparent that by adding one or more weight members 108 to the motor means, the amplitude of the vibratory impulse may be modified because of the difference in weight of the motor means with weight members and receptacle means with material to be separated.

It will be readily apparent that the motor means 112 will similarly impart lateral vibrations to the receptacle means and that the magnitude of such vibratory impulses may be modified by the selective addition or removal of the weight members 123. Thus the receptacle means 83, because of its resilient yieldable mounting on the helical springs 84 from the base frame means may be given a plurality of selected patterns of vibratory movement. It is understood that the two motor means may be separately controlled as to speed.

For example, when only the motor means 98 is operated, a virtually straight line oscillation of the receptacle means may be accomplished by substantially reducing the weight members 108 carried by the motor means since a reduction of said weight members decreases the amplitude of oscillation. A relatively long elliptically shaped pattern may be imparted to the receptacle means when both motor means 98 and 112 are operated at the same speed and the weight members removed from association with the motor means 112. By selective addition of weight members to the respective motor means, the narrowness of the elongated pattern may be modified until an oscillatory movement of virtually circular pattern may be achieved when both motor units are operating at the same speed and with virtually the same number of weight members carried thereby. By independently varying the rate of speed of the two motors and by independently varying the number of weights carried by each motor means, a great variety of oscillatory patterns may be imparted to the receptacle means. A zigzag flow of material may be provided by the inclination of the receptacle means and operation of only the lateral vibratory means 112. Thus, the separating machine of this invention may be readily adapted to materials of different character and the most effective vibratory pattern for separating said materials may be conveniently and easily selected.

It will thus be readily apparent to those skilled in the art that a novel oscillatable means has been disclosed wherein two masses are moved relative to each other and in opposition so as to produce an effective vibratory motion which will efficiently separate aggregative material. The nature of the vibratory impulse may be conveniently modified and controlled so as to impart the most effective vibratory pattern to the material being separated. In addition, the oscillatable separator means of this invention does not transmit vibratory impulses to the supporting base means or to the building in which the machine is installed.

It will be understood by those skilled in the art that various modifications and changes may be made in the separating machine described above and which come within the spirit of this invention and all of such changes and modifications coming within the scope of the appended claims are embraced thereby.

I claim:

1. In an oscillatable separator machine, the combination of: a base frame comprising interconnected upstanding posts; a receptacle means including an imperforate bottom wall, side and end walls and at least one screen means extending between said side walls in spaced relation to the bottom wall and adapted to receive material to be separated; said receptacle means being inclined; yieldable means connected to said posts and to said receptacle means for supporting said receptacle means for oscillating movement; means for oscillating the receptacle means including a motor means having a motor housing and a motor shaft with shaft end portions projecting beyond said motor housing; and means connecting the motor means to the receptacle means for relative movement therebetween, said connecting means including an eccentric connection between each shaft end portion and a wall of the receptacle means, and a yieldable connection between the motor housing and the receptacle means.

2. In a separator machine as stated in claim 1 wherein the means for oscillating the receptacle means is disposed longitudinally of the receptacle means for imparting a longitudinal vibration thereto.

3. A separator machine as claimed in claim 1 wherein the said oscillating means is positioned along a lateral axis of the receptacle means for imparting lateral vibration thereto.

4. A separator machine as stated in claim 1 wherein means are provided on the motor housing for modifying the amplitude of oscillation of the receptacle means.

5. A machine as stated in claim 1 wherein means are carried at one end of the receptacle means for modifying the center of gravity of said receptacle means.

6. In a separating machine, the combination of: a base frame including interconnected upstanding posts; a receptacle means including bottom, side, and end walls and at least one screen means extending between side and end walls in spaced relation to said bottom wall, yieldable means connecting said posts and said receptacle means for supporting said receptacle means for oscillating movement; means for oscillating the receptacle means including a motor means having a housing and oppositely projecting motor shaft end portions; and means connecting the motor housing to the receptacle means for relative movement therebetween, and means connecting said shaft end portions with said receptacle means in spaced relation with respect to the connection of said motor housing to said receptacle means.

7. A separating machine as stated in claim 6 wherein the means connecting said motor housing to said receptacle means comprises a pair of slide rods disposed perpendicularly to the axis of the motor shaft end portions and carried by the receptacle means, and ported brackets carried by the motor housing having spaced sliding connections to said rods.

8. In a separator as stated in claim 6 wherein said motor housing includes a support member projecting away from said housing and in a direction perpendicular to the motor shaft end portions and selected weight members carried by said support member whereby the amplitude of vibration transmitted to said receptacle means may be varied.

9. In an agitatable separator machine, the combination of: a base frame; a receptacle means provided with screen means and adapted to receive material to be separated; yieldable means connecting said receptacle means to said base frame for permitting agitating movement of said receptacle means; independently controllable means to respectively agitate the receptacle means laterally and longitudinally, one of said agitating means being disposed longitudinally of the receptacle means and the other of said agitating means being disposed laterally of the receptacle means, each of said agitating means including a motor means; resilient means to mount each motor means for relative agitating movement with respect to said receptacle means; and means connecting each motor means to the receptacle means including an eccentric connection between said receptacle means and each motor means.

10. A separator machine as stated in claim 9 wherein means are carried by the receptacle means to modify vertical components of vibration forces to said receptacle means.

11. In an agitatable separator machine, the combination of: a base frame comprising interconnected upstanding posts; a receptacle means including an imperforate bottom wall, side and end walls and at least one screen means extending between said side walls in spaced relation to the bottom wall and adapted to receive material to be separated; yieldable means connected to said posts and to said receptacle means for supporting said receptacle means for agitating movement; means for agitating the receptacle means including a motor means having a motor housing and a motor shaft with shaft end portions projecting beyond said motor housing; and resilient means connecting the motor means to the receptacle means for relative agitating movement therebetween, said connecting means including an eccentric connection between each shaft end portion and a wall of the receptacle means.

12. In a separating machine, the combination of: a base frame means; a receptacle means including bottom, side and end walls and at least one screen means extending between side and end walls in spaced relation to said bottom wall; yieldable means connecting said base frame means and said receptacle means for supporting said receptacle means for agitating movement; means to agitate the receptacle means including a motor means having a motor shaft end portion; resilient means mounting the motor means for relative agitating movement with respect to the receptacle means; and means including an eccentric means connecting said shaft end portion with said receptacle means.

13. In a separator means the combination of: a base frame including spaced upstanding posts; a receptacle means for material to be separated; means on said posts for resiliently yieldably suspending said receptacle means for movement thereof in response to longitudinal and vertical force components imparted thereto; and means for imparting said force components to said receptacle means including a motor means resiliently supported from said receptacle means for movement relative thereto, and means providing an eccentric connection between said motor means and said receptacle means, said eccentric connection means including a crank member angularly disposed with respect to the receptacle means and having one end connected to said receptacle means.

14. In a separator means the combination of: a base frame including spaced upstanding posts; a receptacle means for material to be separated; means on said posts for resiliently yieldably suspending said receptacle means for movement thereof in response to longitudinal and vertical force components imparted thereto; and means for imparting said force components to said receptacle means including a motor means resiliently supported from said receptacle means for movement relative thereto, and means providing an eccentric connection between said motor means and said receptacle means, said eccentric connection means including a crank member angularly disposed with respect to the receptacle means and having one end connected to said receptacle means; and means for adjustably modifying the angular relationship of the crank member with respect to the direction of gravitational forces to vary the vertical component of force transmitted to the receptacle means.

15. In a separator means the combination of: a base frame including spaced upstanding posts; a receptacle means for material to be separated; means on said posts for resiliently yieldably suspending said receptacle means for movement thereof in response to longitudinal and vertical force components imparted thereto; and means for imparting said force components to said receptacle means including a motor means resiliently supported from said receptacle means for movement relative thereto; and means connected to the receptacle means to adjustably modify the center of gravity of the resiliently suspended receptacle means and resiliently supported motor means.

16. In a separator machine the combination of: a base frame means; elongated receptacle means including screen means; means yieldably mounting the receptacle means on the base frame means to permit agitating movement of said receptacle means; motor means for agitating the receptacle means; means resiliently mounting the motor means from the receptacle means for relative agitating movement with respect to the receptacle means; and means including a crank member extending longitudinally of the receptacle means and provided with an eccentric connection to the motor means and a connection to the receptacle means adjacent one end thereof.

17. In a separator machine the combination of: a base frame means; receptacle means for material to be separated; means yieldably mounting the receptacle means from the base frame means to permit agitating movement of the receptacle means; motor means for agitating said receptacle means; means yieldably supporting said motor means from said receptacle means and including spaced connections to said receptacle means; and drive means connecting said motor means and said receptacle means including a crank member having one end connected to the receptacle means and provided with an eccentric connection to the motor means.

References Cited in the file of this patent

UNITED STATES PATENTS

| | | |
|---|---|---|
| 424,232 | Stubley | Mar. 25, 1890 |
| 1,649,883 | Woodward | Nov. 22, 1927 |
| 1,820,239 | Merz | Aug. 25, 1931 |
| 1,986,102 | Cole | Jan. 1, 1935 |
| 2,085,774 | Symons | July 6, 1937 |
| 2,163,249 | Sherwen | June 20, 1939 |
| 2,222,299 | Parks | Nov. 19, 1940 |
| 2,415,993 | Cottrell | Feb. 18, 1947 |

FOREIGN PATENTS

| | | |
|---|---|---|
| 248,325 | Germany | June 27, 1911 |